June 10, 1941.  K. M. SLETTEN  2,244,857

BUCKER, STACKER, AND LOADER

Filed May 5, 1939  5 Sheets-Sheet 1

Inventor
Kermit M. Sletten
By Howard Fischer
Attorney

June 10, 1941.                K. M. SLETTEN                2,244,857
                          BUCKER, STACKER, AND LOADER
                          Filed May 5, 1939         5 Sheets-Sheet 3

Inventor
Kermit M. Sletten
By Howard Piehe
                Attorney

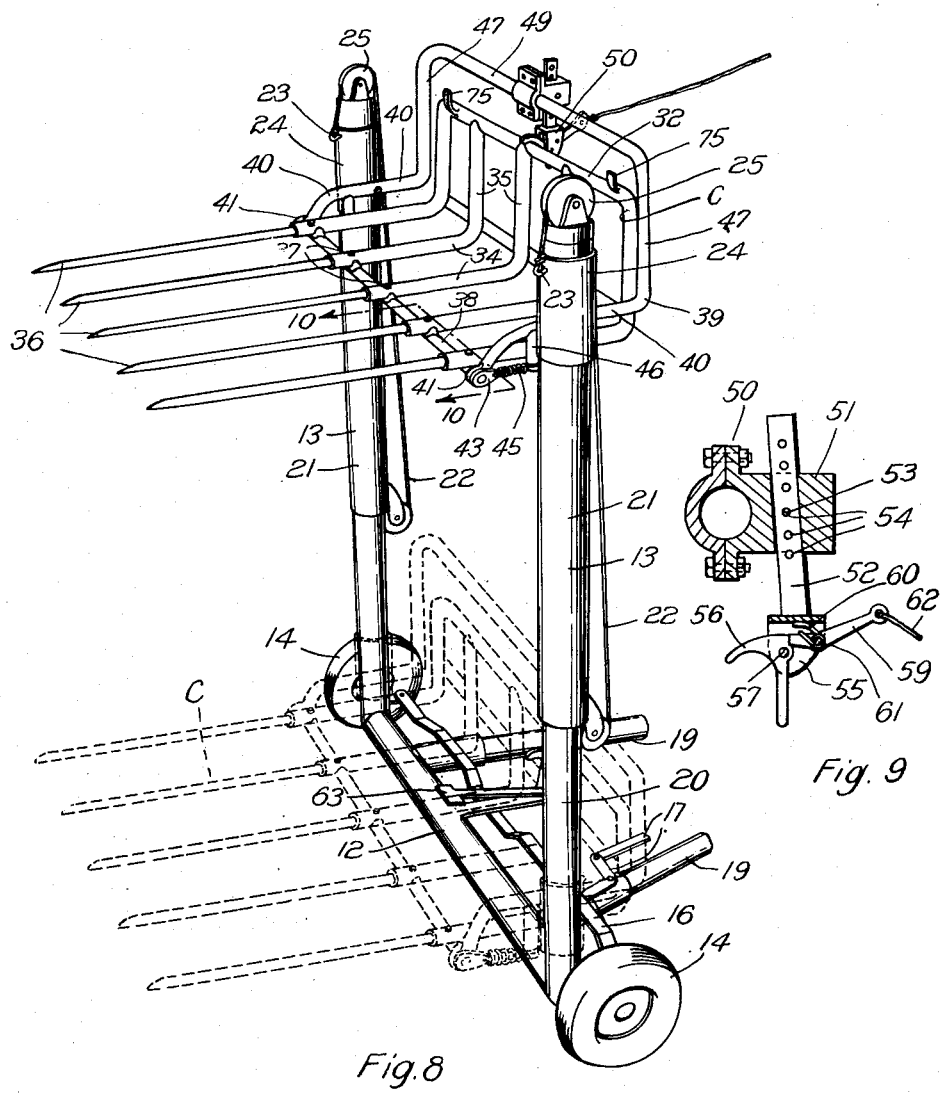
Fig. 8
Fig. 9
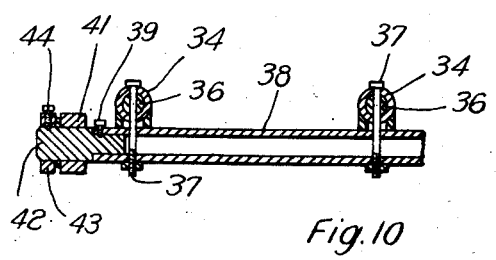
Fig. 10

June 10, 1941.  K. M. SLETTEN  2,244,857
BUCKER, STACKER, AND LOADER
Filed May 5, 1939  5 Sheets-Sheet 5

Inventor
Kermit M. Sletten
By Howard Fischer
Attorney

Patented June 10, 1941

2,244,857

UNITED STATES PATENT OFFICE 2,244,857

BUCKER, STACKER, AND LOADER

Kermit M. Sletten, Willmar, Minn.

Application May 5, 1939, Serial No. 271,866

12 Claims. (Cl. 214—113)

My invention relates to a bucker which may be used for bucking and stacking hay, for loading hay onto a wagon rack, for picking up grain shocks and hauling them to the threshing machines, and for loading grain bundles onto a wagon rack or truck. This device takes the place of a bucker, stacker, a hay loader, and several bundle wagons in threshing operations. This bucker, stacker, and loader is designed to be operated by a tractor or similar power device to efficiently and easily load hay or grain.

A feature of my invention resides in a bucker, stacker, and loader of a simple construction which may be readily attachced to or disengaged from an ordinary tractor and which is braced by longitudinally extending spaced bracing and reach bars which may extend from the rear extremity or frame of the tractor to the sides of the cross frame of the bucker and stacker. This provides a bucker, stacker, and loader which is shorter than prior constructions. The steering means in the bucker and stacker is connected to the steering wheels of a tractor so that they will operate in unison and thus permit the bucker and stacker and the tractor to be easily steered from place to place. This construction also provides a short turning radius for the device.

It is a feature of my invention to provide a cradle having a series of removable tines thereupon which is pivotally supported in a vertically movable frame. The tines are designed to pick up the material to be lifted as the bucker moves forwardly and when the cradle is loaded, it may be hoisted vertically into dumping position so that the material on the cradle may slide into stacked position. The material upon the cradle may be discharged at any point in its upward movement and the load may be hoisted vertically either during movement of the tractor forwardly or rearwardly or while the tractor remains stationary.

It is a feature of my invention to pivotally mount the cradle in its supporting frame so that the tines of the cradle may ride over the surface of the ground regardless of irregularities in the ground. During the loading operation, the tines are usually inclined with respect to the ground to guide the load upwardly onto the cradle. When it is desired to hoist the load or to lift the cradle out of engagement with the ground, the hoisting operation is started and the first movement of the operating cable or power supply device pivots the cradle into horizontal position before the upward movement of the entire cradle begins. Thus with my device the cradle is always in horizontal position during the hoisting operation until released from this position.

A feature of my invention resides in the provision of a cradle having removable tines so that the tines may be replaced or reshaped when desired without the necessity of removing the entire cradle. I also provide a means of removably supporting the cradle as a whole so that the entire cradle may be readily removed from its supporting frame.

It is an important feature of my invention to provide an automatic catch and release mechanism which permits the tines to travel along the uneven surface of the ground, but which engages the cradle in a manner to bring it into horizontal position before the cradle is lifted vertically. I provide one catch which limits pivotal movement of the cradle and operates only when the cradle is in lowered position so that the cradle may pivot within limits in its supporting frame. This catch remains in engagement with the cradle until the cradle assumes horizontal position, whereupon the same is released and the cradle engages a tripping catch on the supporting frame which supports the cradle horizontally until it is desired to release the load. This second catch may then be tripped and the cradle released in order that the same may tilt forwardly and drop the load supported upon the tines. Resilient means are provided to hold the cradle normally in horizontal position.

It is a feature of my invention to provide a supporting frame construction for the cradle which will permit the same to be pivoted into vertical position so that the tines of the cradle are subscantially parallel with the vertical supports. When the cradle is in this position, my device is relatively narrow and may be transported through narrow gates or doorways and may be stored in a relatively small space. The telescopic construction of the standards of my bucker reduces the height when the load is not being lifted, and yet furnishes the necessary height for practically all stacking purposes.

These and other objects and novel features of my invention will be more fully and clearly set forth in the following specification and claims.

In the drawings forming a part of my specification:

Figure 8 is a perspective view of the bucker and stacker in elevated position, showing the telescopic standards vertically extended and the tine cradle in raised position. In dotted outline this cradle is shown in lowered position.

Figure 9 is a sectional detail of the adjustable trip catch which holds the cradle in horizontal position during the elevation of the same.

Figure 10 is a sectional view through a portion of the cradle frame and cradle showing the pivotal support for the cradle.

Figure 1:
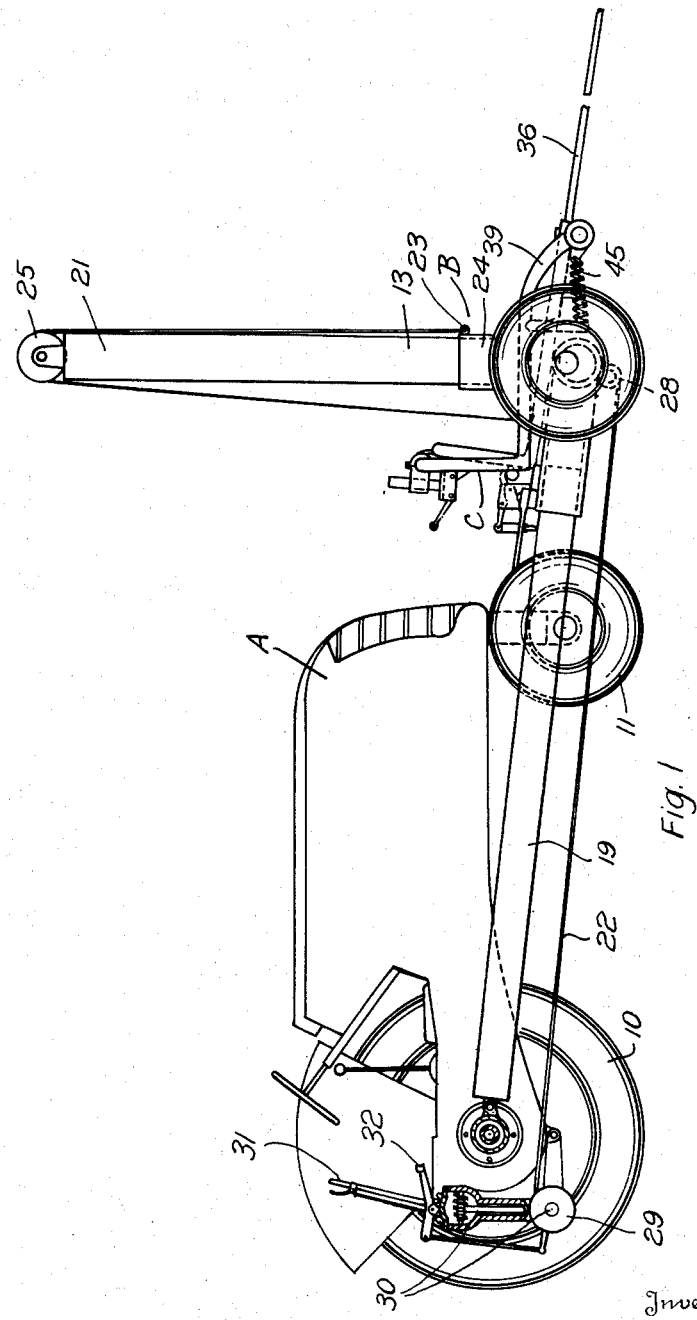
Figure 1 is a side elevational view of my bucker, stacker and loader showing the manner in which the same may be attached to a tractor.
Figure 2:
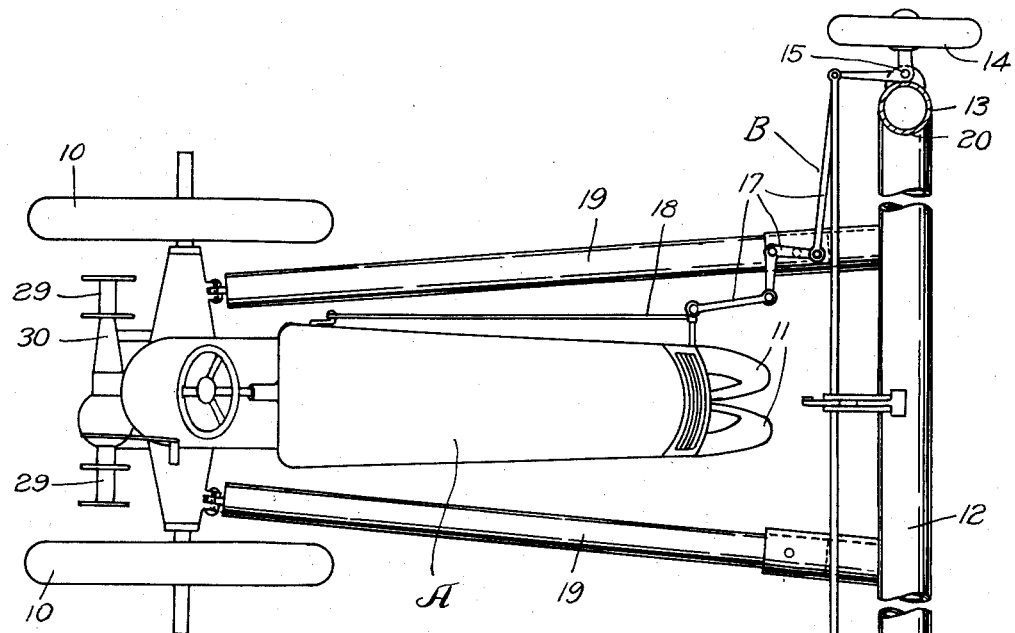
Figure 2 is a plan view of the same with a portion of the bucker and stacker being broken away.
Figure 3:
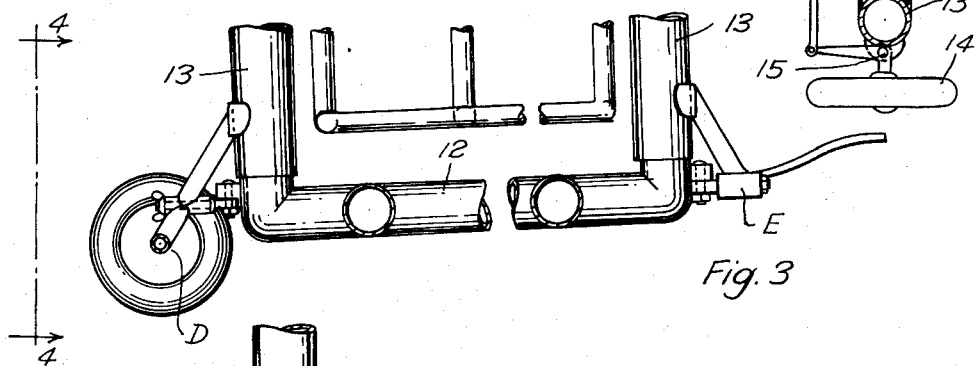
Figure 3 is a front elevational view of the bucker frame, the upper portion of which has been broken away showing the manner in which the bucker may be carried by a rubber tired dolly frame on one end and attached to a tractor on the other end to permit the bucker to be easily moved from place to place when it is detached from the end of the tractor.
Figure 4:
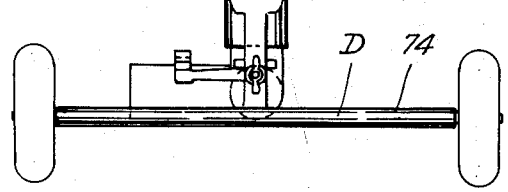
Figure 4 is a side view of the construction illustrated in Figure 3, the direction of the view being indicated by the arrows 4—4 of Figure 3.

My bucker and stacker is designed to be operated by a tractor A which may be of any usual type. As shown in the drawings, the tractor A is provided with drive wheels 10 at the rear and steering wheels 11 at the front of the same. The bucker and stacker B is formed with a tubular frame having a transverse lower member 12 connecting vertically extending telescopic standards 13.

The frame is supported by wheels 14 which are preferably provided with pneumatic tires. The axle or spindle of each wheel is pivotally supported to the frame by the vertical pivots 15, and these axles or spindles are connected by means of a tie-rod 16 so that the wheels 14 may be operated in unison. The tie-rod 16 is operated to steer the wheels 14 by means of link rods and levers 17 which are connected to the steering mechanism 18 for steering the front wheels 11 of the tractor. Thus the bucker and stacker may be steered together with the front tractor wheels 11 of the tractor A.

The bucker and stacker frame is braced by the longitudinally extending reach brace bars 19 which engage in suitable connecting sockets on the frame of the bucker and stacker B, and secure this device to the rear axle or frame of the tractor A. These bars 19 form rigid supporting braces extending directly from the power axle housing or frame of the tractor to the frame member 12 of the bucker and stacker. These brace bars 19 may be disconnected from the sockets on the frame portion 12 and from the axle or frame of the tractor A when desired.

Figure 7:
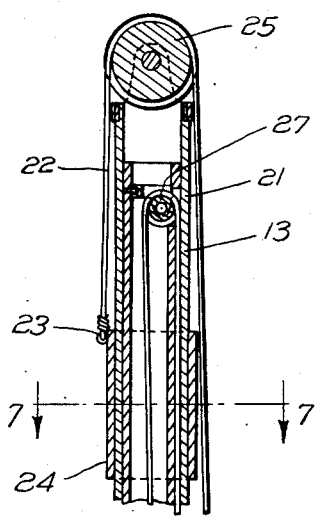
Figure 7 is a cross-sectional view on the line 7—7 of Figure 6.
Figure 7:
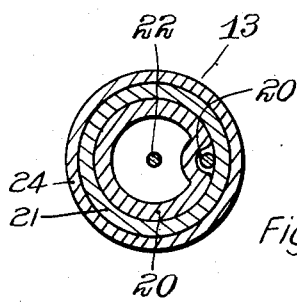
Figure 6:
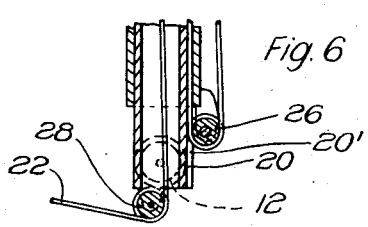
Figure 6 is a vertical sectional detail through one of the supportnig standards of the frame of the bucker.

The construction of the telescopic standards is best illustrated in Figures 6 and 7 of the drawings. Each standard 13 is composed of a lower inner tubular member 20 which telescopes into a larger upper tubular member 21. The lower ends of the standards 13 are welded or otherwise affixed to the cross tubular member 12. The standards are elevated and lowered by means of cables 22, one end of which is secured at 23 to a sleeve 24, supporting the tined cradle in a manner which will be later described. It is the object of the cable 22 to draw the sleeve 24 to its upper-most position, simultaneously raising the upper tubular member into extended position.

The cable 22 is secured at 23 to the sleeve 24 and extends vertically to a sheave or pulley 25 at the top of the upper tubular member 21 of the standard 13. The cable 22 extends over this pulley and down the opposite side of the standard 13 engaging over a sheave or pulley 26 which is secured by a suitable bracket to the lower extremity of the upper tubular member 21. This pulley 26 guides the cable 22 into a vertical groove 20' in the tubular standard member 20. The cable 22 extends upwardly from the groove 20' and passes over a sheave or pulley 27 secured within the tubular member 20 near the upper extremity of the same. The cable 22 is guided over the pulley 27 and passes downwardly through the tubular member 20 and over a sheave or pulley 28 mounted at the lower extremity of the tubular member 20. From this point, the cable 22 extends rearwardly as illustrated in Figure 1 to the hoisting drum 29 of the tractor A. In preferred form, the tractor is provided with two hoisting drums 29 of similar size and shape mounted on the same shaft on either side of the tractor so that each cable 22 from each standard 13 is provided with a separate winding drum upon which the cable is wound. The drums 29 are operated from the power take-off shaft 30 of the tractor, the operation of which is controlled by the lever 31 and the releasing lever 32.

Thus when it is desired to elevate the tined cradle mounted between the sleeves 24 on the standards 13, it is only necessary to operate the power take-off pulleys 29 on the tractor A. This winds the cable 22 which raises the sleeves 24 to their uppermost position on the outer tubular members 21, and also elevates the outer tubular member 21 with respect to the inner tubular member 20. This elevating means thus is relatively short in normal position, but the cradle may be raised to a considerable height when the sleeves 24 are in upper-most position and when the standards are telescoped into extended position.

The tined cradle C is best illustrated in Figures 5, 8, 11, and 12 of the drawings. This cradle C consists in a transverse tubular member 32 and a parallel transverse tubular member 33 to which the tine receiving tubular members 34 are attached. The tubular members 34 are substantially L-shaped as illustrated, and are connected at one end to the transverse member 32 and near the points of bend to the transverse member 33. Thus the tine receiving members include back portions 35 which are substantially at right angles to the remaining portion of the tine receiving members. Tines 36 are removably secured within the tubular tine holding members 34 in any desired manner, such as by the bolts 37. These bolts 37 extend through the tine receiving members 34, through the tines 36, and through a transverse tubular member 38, which forms a pivotal support for the cradle C.

A cradle supporting frame 39 is secured to the sleeves 24 and is raised and lowered with these sleeves. The frame 39 comprises a longitudinal arm 40 having a bearing 41 at the forward end thereof. Through this bearing 41 extends a stub shaft 42 as illustrated in Figure 10 of the drawings. An arm 43 is secured by means of a set screw 44 or other suitable means, to the end of the stub shaft 42 to rotate with the stub shaft. This shaft 42 extends into the transverse tubular member 38 and is secured thereto by a set screw 39 so that the stub shaft 42 rotates in unison with the tubular member 38.

A spring 45 is interposed between each arm 43, and a suitable fixed support 46 on the longitudinal arm 40. This spring 45 holds the cradle C normally in horizontal position and tends to return the cradle C to horizontal position whenever the cradle is pivoted out of this position. This is caused by the lengthening of the spring 45 as the cradle rotates out of horizontal position.

The frame 39 extends upwardly at 47 from each longitudinal arm 40, and these vertical frame portions 47 are connected by a transversely extending connecting portion 49. This transversely extending connecting portion is provided to support a trip mechanism 50 which holds the cradle C normally in horizontal position while a load is being elevated thereby, and permits the load to be dumped when the necessary height is attained. The trip catch 50 is best illustrated in Figure 9 of the drawings. This catch includes a clamping bracket 51 which is clamped about the transverse portion 49 of the frame 39, and through which the trip supporting arm 52 extends. A pin 53 extends through the supporting arm 52 and the clamping body 51 to hold the arm 52 in adjusted position, this pin extending through one of a series of openings 54. A yoke 55 is supported at the lower extremity of the supporting arm 52, and a trip catch 56 is pivoted at 57 between the sides of this yoke. A locking arm 59 engages a shoulder on the trip catch 56 to limit the pivotal movement of this trip catch 56, and the locking arm 59 is held in engagement with the lever 56 by a suitable spring 60. The locking arm 59 is however, pivoted at 61 and may be pivotally moved out of engagement with the shoulder of the trip catch 56 by pulling upon the trip cord 62.

When it is desired to drop the load supported by the cradle C, it is only necessary to pull upon the trip cord or cable 62, whereupon the locking arm 59 is pivoted out of engagement with the trip catch 56, permitting this catch to pivot about its center 57, thus moving out of engagement with the transverse member 32 of the cradle C and permitting the cradle to tilt forwardly and downwardly. When the load is released, the cradle is returned to horizontal position by means of the spring 45.

Figure 11:
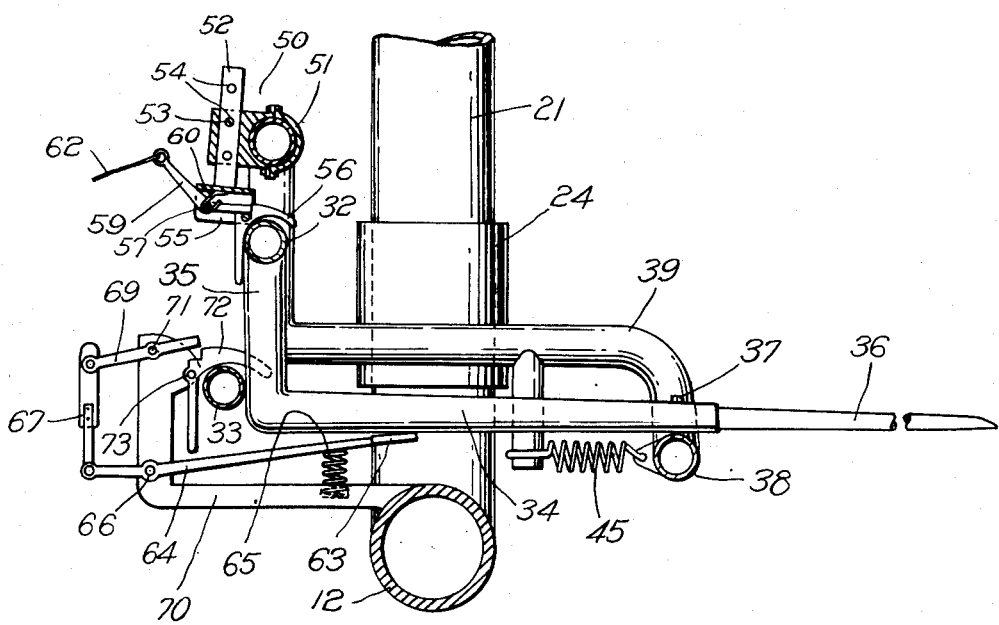
Figure 11 is a sectional view longitudinally through the cradle illustrating the cradle in lowered horizontal position.
Figure 12:
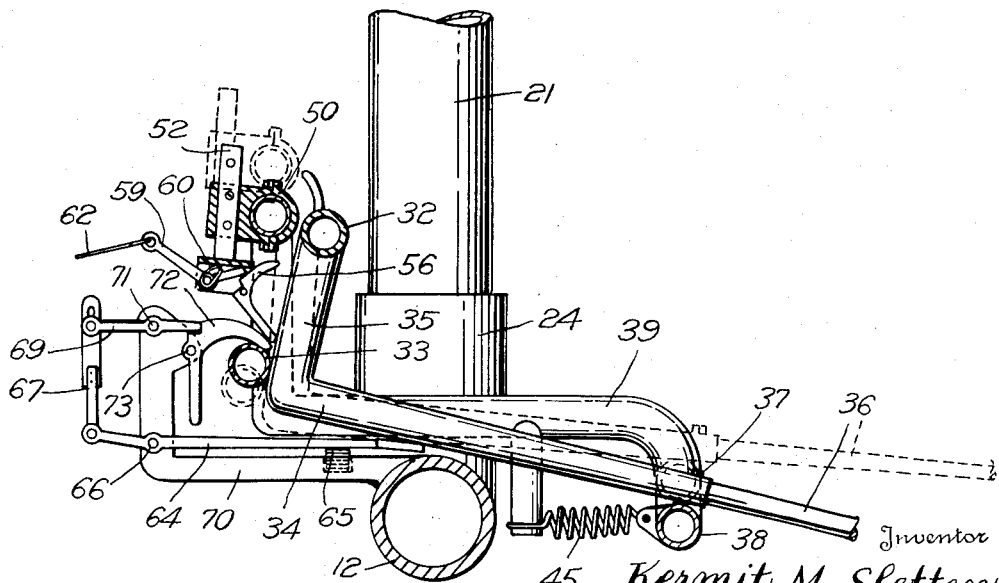
Figure 12 is a view similar to Figure 11 showing two tilted positions of the cradle and indicating the manner of operation of the catch and trip mechanism for bringing the cradle into horizontal position and retaining it in this position.

When it is desired to load the bucker and stacker B, the cradle C is moved into lowered position, as illustrated in Figure 11 of the drawings, and as indicated in dotted outline in Figure 8 of the drawings. When in the position illustrated in Figure 11 of the drawings, one of the tine supporting members 34 of the cradle C strikes the bearing end 63 of the lever 64, and compresses the spring 65. The lever 64 is pivoted at 66 and the end of the lever is pivotally connected to a link 67 which in turn is pivoted to a lever 69. The lever 69 is pivoted to the supporting bracket 70 at 71, and downward movement of the cradle acts to pivot the lever 69 into locking engagement with the pivoted latch 72. The latch 72 is pivoted at 73 to the supporting bracket 70 forming a part of the frame member 12, and engages over the transverse member 33 of the cradle C. When the cradle C is lowered below the point illustrated in Figure 11, the catch 72 is locked in such a manner that the transverse member 33 of the cradle C cannot pivot out of engagement with this catch.

When in this lowered position, the trip cord 62 is pulled, releasing the locking arm 59 and the trip catch 56. The cradle C is then free to pivot about the axis of the stub shafts 42 and about the center of the tubular member 38. The pivoting movement is limited in one direction by the engagement of the tine supporting tubular members 34 and in the other direction by the engagement between the transverse member 32 and the pivoted latch 72. The cradle C may assume any angular position between these limits and two of these positions are indicated, one in full line position, and the other in dotted outline in Figure 12 of the drawings. As the tines 36 assume horizontal position as in Figure 11, the sleeves 24 are raised somewhat on the tubular members 21, and as the tines pivot into full-line position indicated in Figure 12, these sleeves 24 lower on the supporting standards. The cradle is pivoted into engagement with the surface of the ground, and the tines ride over the surface of the ground, the cradle raising somewhat when the tines engage a higher point of the ground and lowering as the tines engage the lower portion of the ground. The tines extend beneath the load which may consist of hay, straw, or any suitable material, and remain inclined until the desired load is placed upon the cradle C.

A means is provided to pivot the cradle into horizontal position before elevating the cradle to any great extent. This means consists in the pivoted latch 72 engaging the transverse member 33. This transverse member engages the latch 72 as the hoisting cable 22 raises the sleeves 24 until the cradle C assumes the horizontal position illustrated in Figure 11 of the drawings. When in this position, the transverse member 32 engages the trip catch 56 pivoting the same until the locking arm 59 engages in the shoulder of the catch 56, whereupon the catch 56 holds the cradle in horizontal position during the remainder of the elevating movement. It will be understood that when the sleeves 24 have raised to the position illustrated in Figure 11, the lever 64 causes the locking lever 69 to be disengaged from the latch 72 simultaneously with the engagement of the transverse member 32 by the trip catch 56. Actually, the catch 56 ordinarily will engage slightly before the disengagement of the latch 72 by the lever 69. Thus the cradle is always held either by the latch 72 or by the trip catch 56, the first of which merely limits the pivotal movement of the tines, while the other holds it horizontal during the elevation of the same.

Figure 5:
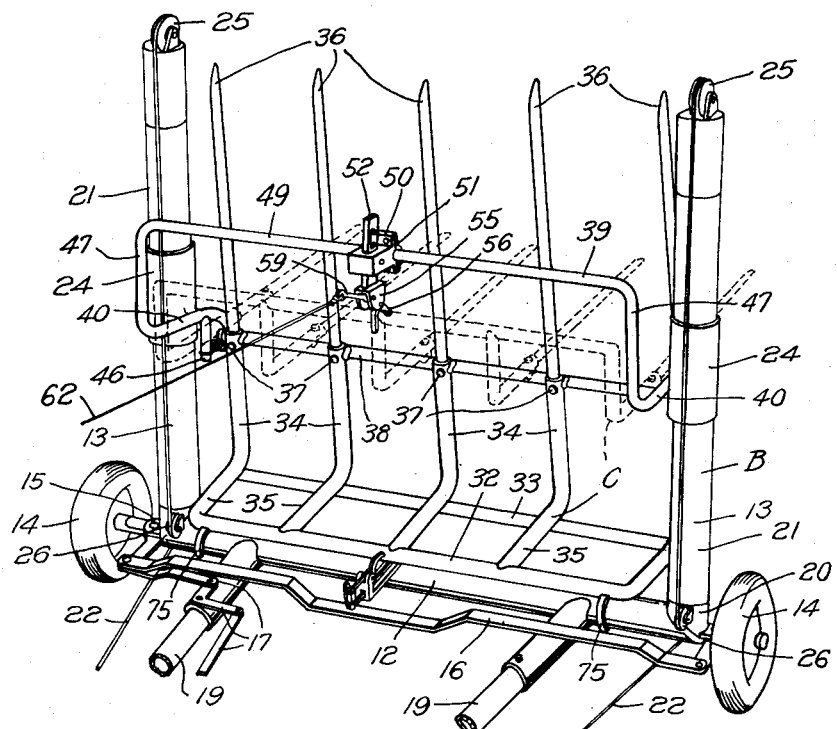
Figure 5 is a perspective view of the bucker and stacker showing the cradle tines tilted into vertical position in full lines, and showing the same in horizontal position in dotted outline.

Because of the size of the bucker and stacker B, it is desirable to provide a means of folding the same into a more compact state for storage purposes or for convenience in transporting the device. When it is desired, the cradle may be manually pivoted so that the tines 36 assume a substantially vertical position. In Figure 5 of the drawings, my bucker and stacker B is illustrated with the cradle C pivoted into folded position, while in dotted outline in this same figure, the cradle is illustrated in horizontal position. When the cradle is to be folded for storage or transporting purposes, the sleeves 24 supporting the frame, which in turn supports the cradle, are raised into the position indicated in Figure 5. The cradle C is then released from the trip catch 56 and manually pivoted about the center of the stub shafts 42 and the tubular transverse member 38. When in folded position, fingers 75 on the transverse member 32 engage the frame member 12 to limit pivotal movement.

When it is desired to transport the bucker and stacker B through a gate or doorway which is narrower than my device, I provide a dolly D which may be attached at one end of the frame member 12. The axle 74 of the dolly D extends transversely with respect to the frame member 12. Thus when the cradle C is in the folded position illustrated in Figure 5, the bucker and stacker B may be easily moved through a relatively narrow gate or doorway. A lead tongue E is connected in place of one of the wheels 14, while the dolly D is secured in the place of the other wheel 14. This lead tongue may be attached to a tractor or other motor vehicle or may be drawn by any suitable device through a relatively narrow aperture. It will be seen that my bucker, stacker and loader is of simple construction and is extremely compact. It may be stored in a relatively small space and yet loads may be lifted to almost twice the normal height of my implement. The load carried upon the tines may be lifted while the tractor is in motion or while it is stationary, and if it is desired, a load may be carried upon the cradle to a stack or pile or may be emptied into a vehicle which is drawn in front of the stacker after the load has been elevated. The cradle may be readily moved over the rough surface of the ground, and be maintained in close proximity to the ground at all times to pick up the entire load. The tines may assume an angle with the horizontal while the loading operation is taking place, and yet may be automatically moved into horizontal position at the start of the hoisting operation. The double catch arrangement insures that the cradle will be in horizontal position at all times during the lifting operation until the trip catch is operated to release the load. Furthermore, the cradle is automatically locked into position to pivot within limits when the cradle is lowered into picking up position.

As the entire implement is closely coupled to the frame of the tractor, the device is easy to steer about from place to place for operation in the bucking and stacking of hay, or for the loading of hay or any other material onto a wagon rack, whether the tractor and bucker is in forward motion or at a standstill. My implement may also be used for picking up grain shocks and hauling them to the threshing machine or loading grain bundles into a wagon rack or truck, or for many other uses too numerous to mention.

In accordance with the patent statutes, I have described the principles of construction and operation of my bucker, stacker, and loader; and while I have endeavored to set forth the best embodiments thereof, I desire to have it understood that this is only illustrative of a means of carrying out my invention, and that obvious changes may be made within the scope of the following claims without departing from the spirit of my invention.

I claim:

1. A bucker and stacker unit comprising a frame having a pair of telescopic extensible standards, means for extending said standards to the full height thereof, a tined cradle adapted for bucking into and picking up a load, frame means for slidably and pivotally connecting said tined cradle to said standards, said frame means including a pair of opposed slides, means offset from said pivotal connection connecting said slides, means on said offset connecting means for holding said cradle with the tines thereof extending horizontally in relation to said standards, means for releasing said tined cradle to permit the same to be dumped and to be folded with the tines thereof projecting upward in line with said standards.

2. A bucker and stacker unit for handling bundles and shocks of grain, hay and similar material, including a pair of telescopic standards, slides thereupon, means connecting said slides, a tined cradle pivotally supported thereby on an axis spaced from said connecting means, means on said connecting means for locking said cradle with the tines thereof extending horizontally, means for releasing said cradle to dump the same when in elevated position, means for locking said cradle in a folded position with the tines thereof projecting upwardly to provide a narrow unit which may be easily moved about, and a wheeled dolly and leader tongue means for facilitating the moving about of said unit when folded.

3. A bucker, stacker and loading unit for grain shocks, hay and the like, including a frame having a pair of telescopic standards, removable steering wheels, steering means for said wheels, removable brace means for connecting said unit to a power tractor or the like, cable means for operating said extensible standards, means for pivotally supporting a tined cradle between said standards, said supporting means including sleeves slidably connected to said standards and connected to and operable by said cable means, and releasable holding means for said cradle to hold the same against pivoting while elevating a load and permitting the cradle to be dumped at the desired height.

4. A bucker, stacker and loader unit comprising supporting and steering wheels, a frame extending between said wheels, telescopic extensible standards projecting upward adjacent said wheels, operating means supported in said standards to extend or retract the same, said operating means including a pair of sleeves slidably mounted on said standards, a cradle frame secured between said sleeves, a forked cradle pivotally supported within said frame, means for locking said cradle in operative horizontal position when in operation and releasable for dumping, and means for locking said cradle in folded position with the tines of the cradle projecting upward to make a compact unit which may be easily moved from place to place.

5. A bucker, stacker and loader unit comprising a pair of spaced standards, a frame vertically slidable on said standards, a tined cradle pivotally mounted in said frame to pivot with respect to said frame and standard, means on said frame engageable with said cradle to hold said cradle locked in substantially horizontal position, means for releasing said cradle holding means to permit said cradle to pivot with respect to said frame and standard, means engageable with said cradle as said frame raises from lowered position thereof to automatically pivot said cradle into horizontal position as said frame is raised, and means for raising said frame.

6. A bucker, stacker and loading unit comprising a pair of vertical spaced standards, a frame slidably secured between said standards, means for raising and lowering said frame, a cradle pivotally mounted in said frame to pivot with respect to said frame and standards, means for pivoting said cradle into engagement with the surface of the ground in lowered position of said cradle, means in the path of movement of said cradle engaging said cradle as said frame is raised to automatically pivot said cradle into horizontal position, and means on said frame engageable with said cradle in horizontal position to hold said cradle in said horizontal position during the raising and lowering of said frame.

7. A bucker, stacker and loader unit comprising a pair of vertical spaced standards, a frame slidably mounted on said standards, means for raising and lowering said frame on said standards, a cradle pivotally mounted in said frame pivotal with respect to said standards, means for pivoting said cradle into engagement with the surface of the ground in lowered position of said frame, means engageable with said cradle as said frame is raised to pivot said cradle into substantially horizontal position, means for disengaging said engaging means when said cradle is pivoted into horizontal position, and means carried by said frame engageable with said cradle to hold said cradle in said horizontal position during the remaining portion of the elevation of the same.

8. A bucker, stacker and loader unit comprising a pair of spaced standards, means connecting said standards, each of said standards comprising a pair of telescopically arranged members, a sleeve surrounding the larger of said telescopic members, a frame extending between said sleeves, a cradle mounted in said frame, and means for raising said frame and cradle including a cable extending through the smaller of said telescopic members, a pulley near the top of said smaller of said telescopic members extending through one wall of said smaller telescopic member over which said cable extends, a groove in the outer surface of the smaller of said telescopic members down which said cable extends, a pulley secured at the bottom of the larger of said telescopic members over which said cable extends, a pulley adjacent the top of the larger of said telescopic members over which said cable extends, and means securing the end of said cable to said sleeve and frame whereby the pull on said cable will move said standard members telescopically and will raise said sleeves upon said standard.

9. A bucker, stacker and loader including a frame having extensible tubular telescopic standards comprising elements of different diameters fitting one within another, wheel means for supporting said unit on the ground, brace means by which said bucker, stacker and loader may be pushed, steering means for said unit, a tined cradle pivotally supported between said telescopic standards, and sheave and cable means connecting to said telescopic extensible standards whereby said standards may be extended and said tined cradle may be simultaneously elevated with the extending of said standards to elevate a load carried by said cradle.

10. A bucker, stacker and loading unit, including a pair of telescopic extensible standards having a plurality of elements one within another formed in said unit, sleeves encircling said standard, a frame supported by said sleeves on said standards, a tined cradle having tines projecting therefrom pivotally supported to said frame, automatic locking means for holding said cradle to said frame with the tines extending horizontally, means for releasing said cradle holding means to permit the cradle to rotate and dump the load therefrom, sheave and cable means carried by said standards, said cable means being connected to said sleeves for supporting said cradle frame, whereby a load on said tined cradle may be elevated and a continued operation of said cable means will automatically lengthen said standards, thereby automatically elevating said tined cradle to a greater height.

11. A bucker, stacker and loader unit, said unit including a tubular frame, steering wheels for supporting said frame, tubular telescopic standards comprising elements one within another forming a part of the tubular frame of said unit, cable means for extending said standards to a greater than normal height when desired, and a bucker cradle having replaceable tines projecting therefrom, said cradle being pivotally and slidably connected to said standards, and being adapted to be elevated by said cable means, whereby said cradle can be raised or lowered to the desired position.

12. The combination of a bucker, stacker and loading unit, means for steering said unit, a forked cradle carried by said unit, means for releasably holding said cradle in a horizontal position and means for dumping the same when elevated to the desired height, finger means for locking said cradle in folded position with the tines thereof projecting vertically, means connected to said cradle for elevating said cradle.

KERMIT M. SLETTEN.